(12) United States Patent
Song et al.

(10) Patent No.: US 12,405,206 B2
(45) Date of Patent: Sep. 2, 2025

(54) FIELD INTEGRATED DEVICE FOR AUTOMATICALLY SHIELDING AND COLLECTING RAINWATER AND SIMULATING RAINFALL AND EXPERIMENTAL METHOD

(71) Applicant: China Institute of Water Resources and Hydropower Research, Beijing (CN)

(72) Inventors: Yifan Song, Beijing (CN); Xiaogang Wang, Beijing (CN); Tianling Qin, Beijing (CN); Yajing Lu, Beijing (CN); Denghua Yan, Beijing (CN); Tiejun Liu, Hohhot (CN); Jianan Yao, Hohhot (CN); Rui Jiao, Hohhot (CN); Yumei Tan, Hohhot (CN); Baisha Weng, Beijing (CN); Yaru Feng, Hohhot (CN); Xiaojie Yang, Hohhot (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 300 days.

(21) Appl. No.: 18/312,728

(22) Filed: May 5, 2023

(65) Prior Publication Data
US 2024/0255413 A1    Aug. 1, 2024

(30) Foreign Application Priority Data

Jan. 31, 2023  (CN) .................... CN202310106258.9

(51) Int. Cl.
*G01N 17/00* (2006.01)
*E03B 3/02* (2006.01)

(52) U.S. Cl.
CPC ............. *G01N 17/002* (2013.01); *E03B 3/02* (2013.01)

(58) Field of Classification Search
CPC .................................................... G01N 17/002
(Continued)

(56) References Cited

U.S. PATENT DOCUMENTS

2022/0244426 A1 * 8/2022 Hallali ................ G01W 1/10

FOREIGN PATENT DOCUMENTS

| CN | 109392665 A | * 3/2019 | ............. A01G 25/02 |
| CN | 110965843 A | * 4/2020 | ............... E04B 7/16 |

OTHER PUBLICATIONS

Chen et al. Machine translation of CN109392665A. Published Mar. 2019. Accessed Apr. 2025. (Year: 2019).*

(Continued)

*Primary Examiner* — Walter L Lindsay, Jr.
*Assistant Examiner* — Philip T Fadul
(74) *Attorney, Agent, or Firm* — GRUMBLES LAW PLLC (57) ABSTRACT

The present disclosure provides a field integrated device for automatically shielding and collecting rainwater and simulating rainfall and an experimental method. The field integrated device comprises a roller shutter assembly. A rainfall assembly and a rainwater collecting assembly are fixed on the roller shutter assembly. The roller shutter assembly guides rainwater into the rainwater collecting assembly while shielding the rainwater. The rainfall assembly is connected with a pumping assembly. The pumping assembly transports the rainwater to the rainfall assembly to realize artificial rainfall simulation. The pumping assembly is fixed in a solar module. The solar module is electrically connected with the pumping assembly and a driving assembly in the roller shutter assembly. The solar module is in signal connection with a remote signal end.

16 Claims, 3 Drawing Sheets

(58) Field of Classification Search
USPC .............................................. 73/86
See application file for complete search history.

(56) References Cited

OTHER PUBLICATIONS

Shu et al. Machine translation of CN110965843A. Published Apr. 2020. Accessed Apr. 2025. (Year: 2020).*

* cited by examiner

FIELD INTEGRATED DEVICE FOR AUTOMATICALLY SHIELDING AND COLLECTING RAINWATER AND SIMULATING RAINFALL AND EXPERIMENTAL METHOD

CROSS-REFERENCE TO RELATED APPLICATION

This patent application claims the benefit and priority of Chinese Patent Application No. 2023101062589, filed with the China National Intellectual Property Administration on Jan. 31, 2023, the disclosure of which is incorporated by reference herein in its entirety as part of the present application.

TECHNICAL FIELD

The invention relates to the technical field of artificial rainfall simulation, in particular to a field integrated device for automatically shielding and collecting rainwater and simulating rainfall and an experimental method.

BACKGROUND

The artificial rainfall simulating experiment refers to an experimental method of simulating natural rainfall scenes under different increasing/decreasing conditions and observing soil erosion, runoff and sediment yield processes under different treatment conditions through artificial rainfall devices. The artificial rainfall simulating experiments can be divided into indoor artificial rainfall simulation experiments and field artificial rainfall simulation experiments. Compared with natural rainfall (nature rainfall), the artificial rainfall simulation experiment has the advantages of low time consumption, high efficiency, easy control, high adaptability and the like. At the same time, according to the experimental purpose, the combination of different experimental conditions and schemes can be carried out to obtain data not easy or difficult to observe under natural conditions.

Compared with the indoor artificial rainfall simulation experiment, the field artificial rainfall simulation experiment is closer to natural conditions, so the indoor artificial rainfall simulation experiment has higher experimental value. However, the field artificial simulation experiment also needs higher requirements for control conditions and use scenarios.

The existing field artificial rainfall simulating devices need high requirements on manpower, water and electricity resources (needing to be close to power supply and water sources), so that the use scenarios are limited, and the use of field experiments is limited in remote areas with incomplete hydropower resources. In addition, rainwater shielding is an important control condition for artificial rainfall control experiments. In the process of the artificial rainfall control experiment, it is often necessary to shield rainwater in a certain period to reduce the rainfall precipitation of the experimental ground, so that the purpose of controlled experiments under different rain increase/decrease conditions is achieved. However, at present, most of rainwater shielding devices must be temporarily erected by manpower before the experiment starts, and then removed after the rain stops. Most of rainwater shielding devices are poor in timeliness and highly dependent on manpower. If workers are absent, the experiment cannot be carried out smoothly, thus the ideal experimental cycle is missed, and the use scenarios of controlled precipitation experiments in remote areas in the wild are also limited.

SUMMARY

Aiming at the above problems in the prior art, the present disclosure provides a field integrated device for automatically shielding and collecting rainwater and simulating rainfall, and solves the problems that the existing field artificial rainfall simulating device can not be applied to remote and unmanned places and the applicable scene is limited.

In order to achieve the above purpose, the present disclosure adopts the following technical scheme.

In a first aspect, disclosed is a field integrated device for automatically shielding and collecting rainwater and simulating rainfall, including a roller shutter assembly. The roller shutter assembly includes a four-corner support with height difference. The high side of the four-corner support is connected with a mounting seat, and the low side of the four-corner support is respectively connected with two baffles. The two baffles are respectively oppositely fixed on the two ends of the mounting seat. The mounting seat is provided with a humidity sensitive element. The mounting seat is internally provided with a driving assembly and a roller shutter. The driving assembly is rotationally connected with the roller shutter. The driving assembly drives the curtain plate of the roller shutter to be unfolded and contracted between the two baffles. A rainfall assembly is fixed between the two baffles. The rainfall assembly is connected with a pumping assembly. The pumping assembly is connected with the bottom of a water storage tank. The upper part of the water storage tank is connected with a rainwater collector. The rainwater collector is fixed at the lower parts of the two baffles for collecting the rainwater on the roller shutter. The pumping assembly and the water storage tank are fixed on the solar stand of a solar module. The solar module is respectively electrically connected with the humidity sensitive element, the driving assembly and the pumping assembly. The solar module is in signal connection with a remote signal end.

In this scheme, the roller shutter is matched with the rainwater collecting assembly to collect natural rainwater. The collected natural rainwater is used for artificial rainfall simulation to realize artificial rainfall simulation in the field. The four-corner support is simple in structure, and also can raise the roller shutter, so that a gap is formed between the experimental ground and the curtain plate of the roller shutter, air can circulate naturally, the change of the device to the natural environment is reduced, and the experimental accuracy is improved.

Further, the roller shutter includes a drum, and the drum is connected with the driving assembly. One side of the curtain plate is fixedly connected with the drum, and the other side of the curtain plate is wound on the drum. Sliding chutes are formed in the two baffles. The two sliding chutes are arranged oppositely. Two sides of the free end of the curtain plate are respectively embedded in the two sliding chutes, and are unfolded and contracted in the sliding chutes.

Further, the driving assembly includes a first motor, and the first motor is fixed in mounting seat; and the output shaft of the first motor is rotationally connected with the drum through a first coupling, and the first motor is electrically connected with the solar module.

In this scheme, the solar module controls the starting and steering of the motor, and the forward rotation of the motor drives the drum to rotate to unfold the curtain plate in the sliding chute, so that the rain shielding function is realized. The reverse rotation of the motor drives the drum to rotate to shrink the curtain plate, so that the rain shielding function is turned off.

Further, the rainwater collector is a hollow cylinder. Both ends of the cylinder are respectively welded on the two baffles. A rainwater collecting port is formed in the middle of the cylinder. The two sliding chutes extend into the rainwater collecting port. A water outlet hole is formed in one end of the cylinder. The water outlet hole is connected with the water storage tank through a rainwater collecting pipe. The free end of the curtain plate extends into the rainwater collecting port through the sliding chutes. The rainwater in the cylinder flows into the water storage tank through the water outlet hole.

In this scheme, the curtain plate is fixed on the four-corner support with height difference and has a certain inclination angle. In rainy days, all the rainwater on the curtain plate is introduced into the rainwater collector through the rainwater collecting port, and then the rainwater is introduced into the water storage tank to complete rainwater collection.

Further, the rainfall assembly includes a steel pipe. The water inlet of the steel pipe is connected with the pumping assembly through a water pipe. The steel pipe is connected with a plurality of rainfall steel pipes. The rainfall steel pipes are uniformly and vertically distributed on the steel pipe. One end is welded and connected with the steel pipe, the other end is welded and connected with the baffle, and the welding position is located under the sliding chute. A plurality of sprinkler heads are arranged on the rainfall steel pipe.

In this scheme, the pumping assembly pumps water from the water storage tank to the steel pipe, and the steel pipe distributes water to the rainfall steel pipes, and sprinkles water through the sprinkler heads on the rainfall steel pipes to realize artificial rainfall simulation.

Further, the pumping assembly includes a base. The base is fixed on the solar stand. A second motor is fixed on the base. The output shaft of the second motor is rotationally connected with a water pump through a second coupling. The water inlet of the water pump is connected with the water storage tank. The water outlet of the water pump is connected with the water pipe.

In this scheme, the second motor drives the water pump to rotate, and the water pump converts mechanical energy into hydraulic energy of water, so that the water in the water storage tank enters the steel pipe.

Further, a bathysonde is fixed on the top of the water storage tank, and the bathysonde is electrically connected with the solar module.

In this scheme, the bathysonde can detect the water level height of the water storage tank, the water quantity of the water storage tank can be detected, the rainfall intensity of natural rainfall during rainwater collection can be obtained, and the signal can be transmitted to the remote signal end through the solar module to realize long-distance monitoring of water quantity and rainfall intensity.

Further, the solar module includes a solar panel. The solar panel is fixed on the top of the solar stand. An electrical box is fixed in the middle of the solar stand. A signal antenna is fixed on the electrical box. The signal antenna is in signal connection with the remote signal end. A storage battery and a controller are arranged in the electrical box. The controller is electrically connected with the solar panel, the signal antenna, the first motor, the second motor, the bathysonde and the humidity sensitive element, respectively.

In this scheme, the solar panel converts light energy into electrical energy and stores the electrical energy in the storage battery through the controller. The storage battery provides the electrical energy for the controller. The controller can collect the signals of the bathysonde and the humidity sensitive element, and can control the starting of the first motor and the second motor. The remote signal end can detect the signal in the controller in real time and transmit an instruction to the controller through the signal antenna.

In a second aspect, disclosed is an experimental method of the field integrated device for automatically shielding and collecting rainwater and simulating rainfall, including the following steps:

S1, setting adjacent experimental ground and contrast ground with equal area, and placing the experimental ground below the roller shutter assembly;

S2, setting the rotational speed and working time of the second motor, starting the second motor to drive the water pump to rotate, pumping the rainwater in the water storage tank to the rainfall assembly, and spraying the rainwater to the experimental ground below the roller shutter assembly by the sprinkler heads in the rainfall assembly to simulate artificial rainfall;

S3, collecting a natural rainfall signal in real time by the humidity sensitive element, and if the humidity sensitive element does not detect the natural rainfall signal, executing step S7, and if the humidity sensitive element detects the natural rainfall signal, executing step S4;

S4, transmitting the detected natural rainfall signal to the controller by the humidity sensitive element, starting the first motor of the driving assembly by the controller, driving the drum to rotate by the first motor, and driving the curtain plate to slide in the sliding chute by the drum until the free end of the curtain plate extends into the rainwater collector to shield natural rainwater;

S5, enabling the natural rainwater to enter the rainwater collector along the curtain plate and fall into the water storage tank through the rainwater collecting pipe to collect the rainwater;

S6, detecting the water level change of the water storage tank by the bathysonde, and calculating to obtain the natural rainfall intensity according to the water level change; and S7, turning off the second motor to end the experiment.

The field integrated device for automatically shielding and collecting rainwater and simulating rainfall has the following beneficial effects.

Firstly, the field integrated device can realize artificial rainfall simulation, and has the functions of automatically supplying power and keeping out and collecting rainwater. The field integrated device can be monitored and controlled in real time through the remote signal end, and is suitable for remote and unmanned places and wide in applicable scenes.

Secondly, the solar panel converts light energy into electrical energy and stores the electrical energy in the storage battery through the controller. The storage battery provides the electrical energy for the controller. The humidity sensitive element can detect the rainfall signal and transmit the signal into the controller. The controller controls the first motor to drive the curtain plate of the roller shutter to shield rainwater. The rainwater is guided into the rainwater collector while the rainwater is shielded by the curtain plate, and then the rainwater is guided into the water storage tank by the rainwater collector. The rainwater inside the water storage tank enters the rainfall assembly for rainfall under the driving of the pumping assembly. The remote signal end can detect the signal in the controller in real time and transmit an instruction to the controller through the signal antenna.

Reference signs: 1, roller shutter assembly; 11, mounting seat; 111, first motor; 112, first coupling; 113, drum; 114, curtain plate; 115, humidity sensitive element; 12, baffle; 121, sliding chute; 13, four-corner support; 2, rainfall assembly; 21, steel pipe; 22, rainfall steel pipe; 221, sprinkler head; 23, water pipe; 3, rainwater collecting assembly; 31, rainwater collector; 311, rainwater collecting port; 312, water outlet hole; 32, rainwater collecting pipe; 33, water storage tank; 331, bathysonde; 4, pumping assembly; 41, second motor; 42, second coupling; 43, water pump; 44, water inlet pipe; 45, water outlet pipe; 451, valve; 46, base; 5, solar module, 51, solar panel; 52, electrical box; 521, controller; 522, signal antenna; 523, storage battery; 53, solar stand; and 6, experimental ground.

DETAILED DESCRIPTION OF THE EMBODIMENTS

Specific embodiments of the present disclosure are described below so as to facilitate the understanding of the present disclosure by those skilled in the art. However, it should be understood that the present disclosure is not limited to the scope of the specific embodiments and that all inventions utilizing the present ideas are protected to those skilled in the art as long as various variations are apparent within the spirit and scope of the present disclosure as defined and determined by the appended claims.

Figure 1:
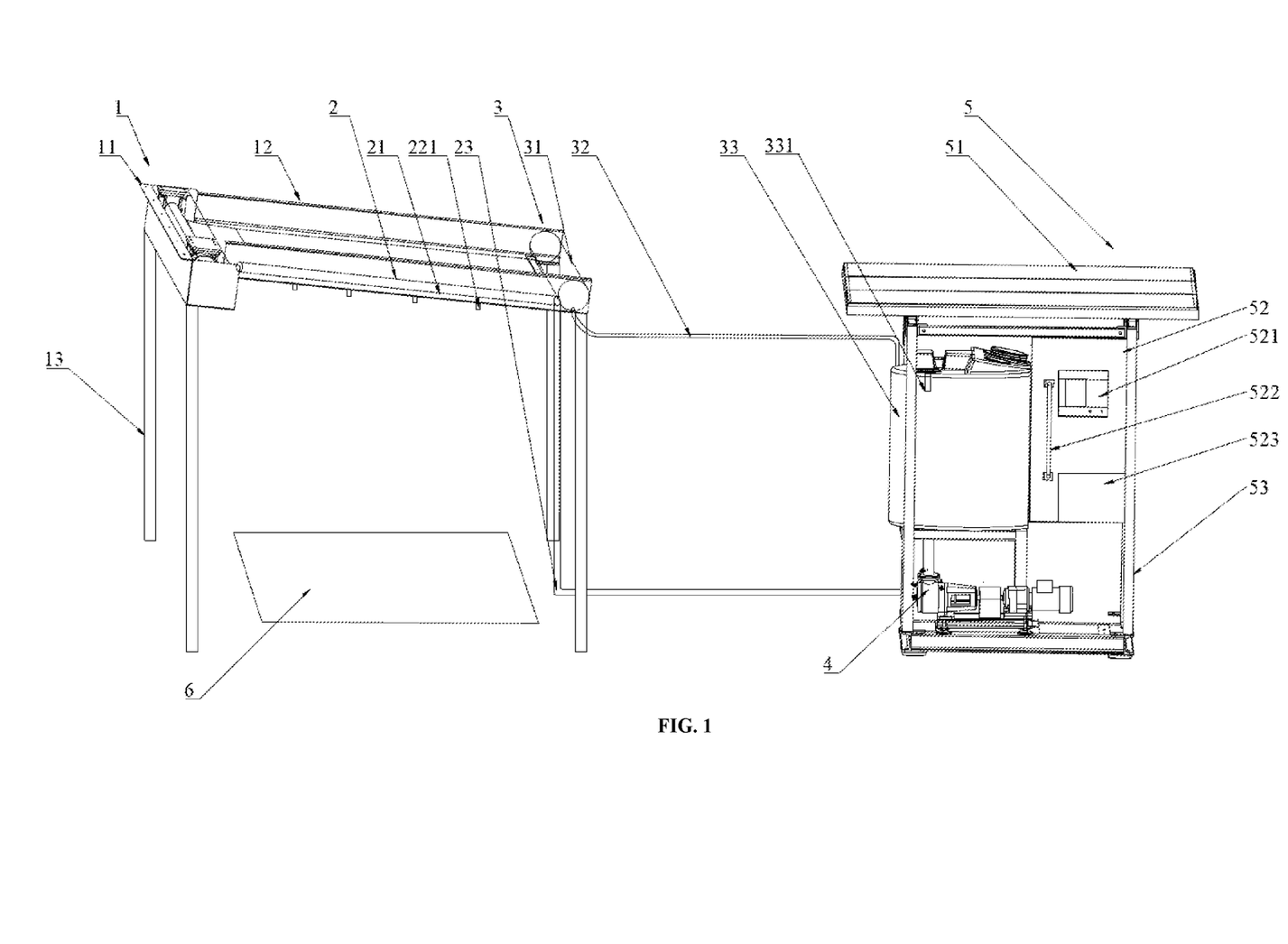
FIG. 1 is a structural schematic diagram of a field integrated device for automatically shielding and collecting rainwater and simulating rainfall.

According to one embodiment of the present application, referring to FIG. 1, the field integrated device for automatically shielding and collecting rainwater and simulating rainfall of the present scheme includes a roller shutter assembly 1, a rainwater collecting assembly 2, a rainwater collecting assembly 3, a pumping assembly 4, a solar module 5 and a signal end.

Figure 2:
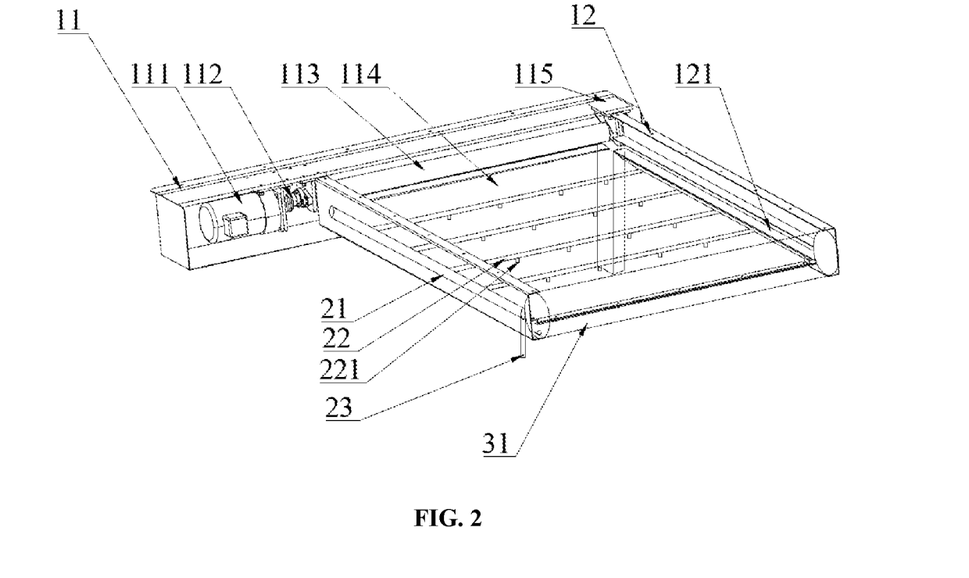
FIG. 2 is a structural schematic diagram of a roller shutter assembly.

The roller shutter assembly 1 includes a mounting seat 11, two baffles 12 and a four-corner support 13. Referring to FIG. 2, the mounting seat 11 is a hollow cuboid. The upper side of the cuboid is in threaded connection with the humidity sensitive element 115. The side edge of the cuboid is welded and connected with the two baffles 12, and the two baffles 12 are arranged oppositely. The two opposite ends of the four-corner support 13 have height difference. The high side of the four-corner support 13 is connected with the mounting seat 11, and the low side of the four-corner support 13 is respectively connected with the two baffles 12. The four-corner support 13 enables the baffles 12 to form a certain inclination angle with the ground, so that the rainwater is convenient to concentrate and flow into the rainwater collector 31 at low places.

The mounting seat 11 includes a first motor 111, a first coupling 112, a roller shutter and a humidity sensitive element 115, and the roller shutter includes a drum 113 and a curtain plate 114. The base 46 of the first motor 111 is fixed inside the cuboid through thread connection. The first motor 111 is electrically connected with the solar module 5. The first motor 111 is rotationally connected with the drum 113. Specifically, two bearing seats are oppositely arranged inside the mounting seat 11. Bearings are installed in the two bearing seats. The outer ring of the bearing is in interference fit with the hole of the bearing seat. The drum 113 is internally provided with a rotating shaft in a penetrating manner. One end of the rotating shaft extends into one bearing and is in interference fit with the inner ring of the bearing, and the other end of the rotating shaft passes through the inner ring of the other bearing to be in clearance fit with the inner ring of the bearing and is connected with one end key of the first coupling 112. The other end of the first coupling 112 is connected with the output shaft key of the first motor 111. The first coupling 112 has the functions of buffering and shock and vibration absorption. The first motor 111 is connected with the rotating shaft of the drum 113 through the first coupling 112, so that the drum 113 rotates smoothly.

The two baffles 12 are internally provided with sliding chutes 121 matched with the curtain plate 114. The two sliding chutes 121 are arranged opposite to each other, and the sliding chute 121 extends into the rainwater collecting port 311 of the rainwater collector 31. One side of the curtain plate 114 is fixedly connected with the drum 113, and the other side of the curtain plate 114 is wound on the drum 113. Both sides of the free end of the curtain plate 114 are provided with sliding blocks. The two sliding blocks are embedded in the sliding chute 121 and are in sliding connection with the sliding chute 121, so that the friction force of the sliding block is small, and the curtain plate 114 is not easy to jam when moving in the sliding chute 121. The curtain plate 114 in the embodiment is made of polyvinyl chloride (PVC) transparent material, so that the rainwater is shielded without affecting the illumination. In rainy days, the humidity sensitive element 115 detects a humidity signal and feeds the humidity signal back to the controller 521 of the solar module. The controller 521 compares the signal with a set threshold value. When the humidity signal is larger than the set threshold value, the controller 521 judges that it is raining. When the humidity signal is less than or equal to the set threshold, the controller 521 judges that it is sunny.

The embodiment does not limit the specific value of the threshold value, because the humidity values in different working environments and environments with different geographical conditions are not the same, that is, the threshold value can be set according to the local geographical position and environmental conditions, and the embodiment is not limited here.

When the controller 521 judges that it is raining, the controller controls forward rotation of the first motor 111 to drive the drum 113 to rotate, and the drum 113 drives the curtain plate 114 to be unfolded in the sliding chute 121 and enter the rainwater collecting port 311, so that the rainwater falls into the rainwater collecting port 311 along the curtain plate 114 to complete rainwater collection. When the controller 521 judges that it is sunny, the controller 521 controls reverse rotation of the first motor 111, and the first motor 111 drives the drum 113 to rotate and shrink the curtain plate 114, so that the rain shielding function is turned off, and the automatic rain shielding function under the unmanned conditions is realized.

Figure 4:
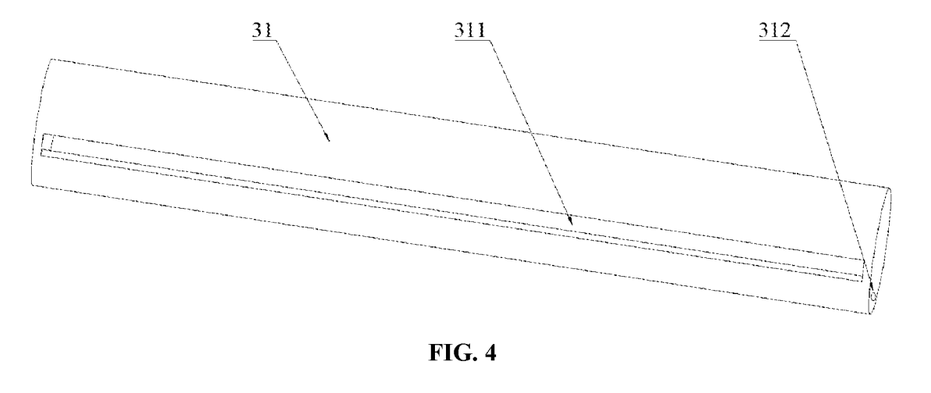
FIG. 4 is a structural schematic diagram of a rainwater collecting pipe.

The rainwater collecting assembly 3 includes a rainwater collector 31, a rainwater collecting pipe 32 and a water storage tank 33. Referring to FIG. 4, the rainwater collecting device 31 is a hollow cylinder with both ends welded on the two baffles 12. A rainwater collecting port 311 is formed in the middle of the cylinder. Two sliding chutes 121 extend into the rainwater collecting port 311. A water outlet hole 312 is formed in one end of the cylinder, and the water outlet hole 312 is connected with the water storage tank 33 through the rainwater collecting pipe 32. The free end of the curtain plate 114 extends into the rainwater collecting port 311 through the sliding chute 121. The rainwater on the sliding chute 121 falls into the cylinder. The rainwater in the cylinder flows into the water storage tank 33 through the water outlet hole 312. The water storage tank 33 is fixed to a solar stand 53. There is a certain amount of water in the water storage tank 33 before the experiment. A bathysonde 331 is fixed on the top of the water storage tank 33, and the bathysonde 331 is electrically connected with the controller 521. The bathysonde 331 of the embodiment, preferably an ultrasonic water level sensor, detects the water level change in the water storage tank in real time, and calculates to obtain the natural rainfall intensity according to the water level change.

The controller 521 sets the artificial rainfall simulation intensity by controlling the pumping device. When a rainfall assembly 2 is used for rainfall, the ultrasonic water level sensor detects the water level drop depth of the water storage tank 33 to monitor the rainfall amount of artificial simulated rainfall. The controller 521 judges whether the artificial simulated rainfall amount is consistent with the amount of water reduced by the water storage tank 33, so that whether water is leaked or not is detected. When the water is leaked, the controller 521 transmits a signal to a remote signal end through a signal antenna 522, and the experimenter can repair the water storage tank 33 in time after receiving the signal. In case of natural rainfall, the roller shutter shields the rain, and the rainwater is introduced into the water storage tank 33. The ultrasonic water level sensor detects the water level rising height of the water storage tank 33 and feeds back the water level rising height to the controller 521, so that the controller 521 obtains the natural rainfall intensity.

Figure 3:
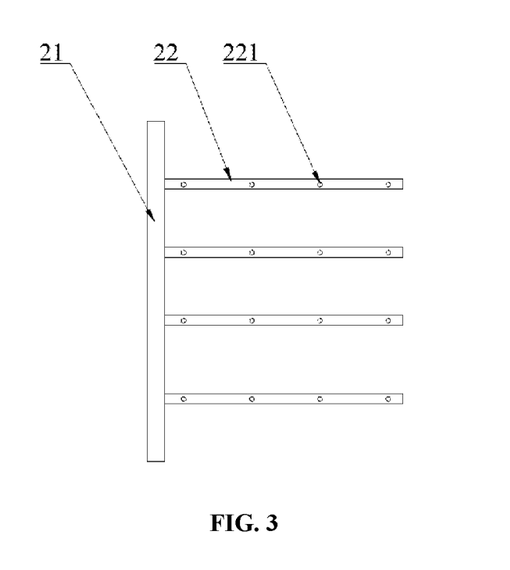
FIG. 3 is a structural schematic diagram of a rainfall assembly.

The rainfall assembly 2 includes a copper pipe, a rainfall copper pipe and a water pipe 23. Referring to FIG. 3, the water inlet of the copper pipe is connected with the water pipe 23. The water pipe 23 is connected with the pumping assembly 4. A steel pipe 21 is connected with a plurality of rainfall steel pipes 22. A plurality of rainfall steel pipes 22 are uniformly and vertically distributed on the steel pipe 21. One end of the rainfall steel pipe 22 is welded and connected with the steel pipe 21. The steel pipe 21 and the rainfall steel pipe 22 are oppositely welded on both sides of the two baffles, and are all located below the sliding chute 121. A plurality of sprinkler heads 221 are fixed on the rainfall steel pipes 22. The sprinkler head 221 is connected with the rainfall steel pipe 22. The pumping assembly 4 pumps water from the water storage tank 33 to the steel pipe 21. The steel pipes 21 distribute water into the rainfall steel pipes 22, and sprinkle water through the sprinkler heads 221 on the rainfall steel pipes 22 to realize artificial rainfall simulation.

Figure 5:
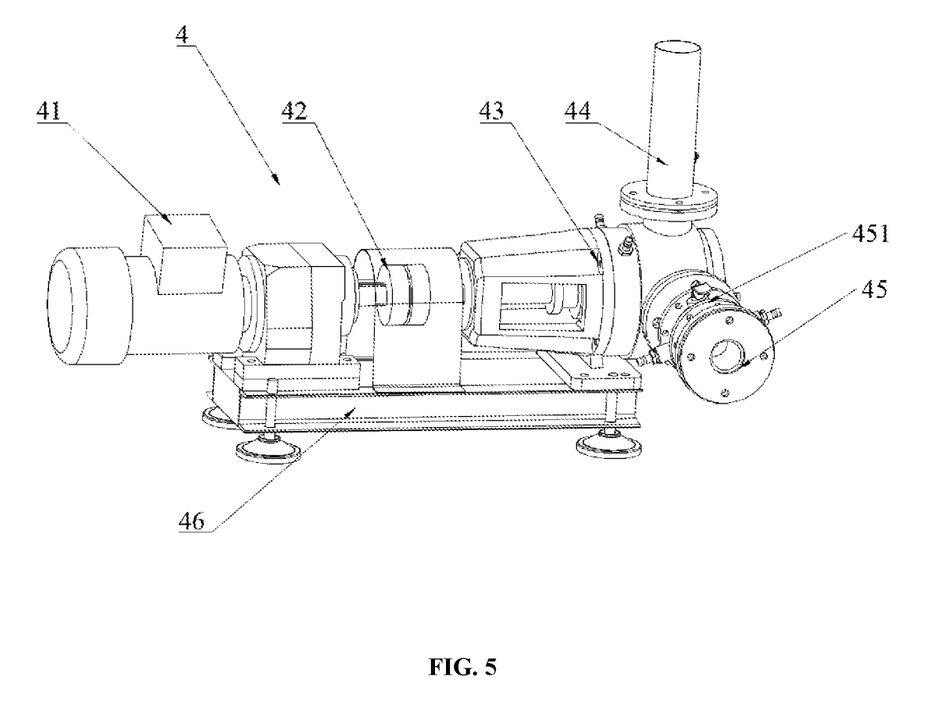
FIG. 5 is a structural schematic diagram of a pumping assembly.

The pumping assembly includes a second motor 41, a second coupling 42, a water pump 43, a water inlet pipe 44, a water outlet pipe 45, a valve 451 and a base 46. Referring to FIG. 5, the base 46 is fixed to the solar stand 53 through bolted connection. The second motor 41 is in bolted connection with the base 46. One end of the second coupling 42 is connected with the output shaft key of the second motor 41, and the other end of the second coupling 42 is connected with the input shaft key of the water pump 43. In this embodiment, the second coupling 42 preferably is a flexible coupling. The flexible coupling can compensate the deviation between the output shaft of the second motor 41 and the input shaft of the water pump 43, and has the functions of buffering and shock and vibration absorption, so that it is ensured that the second motor 41 and the water pump 43 can work in the field for a long time.

The flexible coupling of this embodiment is externally provided with a protective cover. The protective cover is in bolted connection with the base 46. The protective cover can prevent the flexible coupling from being invaded by dust such as fallen leaves in the field to affect rotation. The water inlet of the water pump 43 is connected with the bottom of the water storage tank 33. It is ensured that the water in the water storage tank 33 can continuously enter the water pump 43 under the action of gravity. The water outlet of the water pump 43 is provided with a valve 451. The valve 451 is connected with the water pipe 23. The second motor 41 drives the water pump 43 to rotate. The water pump 43 converts mechanical energy into hydraulic energy of water, so that the water in the water storage tank 33 enters the steel pipe 21. The controller 521 controls the rotational speed of the second motor 41 to control the flow rate of the water pump, so that the rainfall intensity can be adjusted.

The solar module 5 includes a solar panel 51, an electrical box 52 and a solar stand 53. The motor box includes a controller 521, a signal antenna 522 and a storage battery 523. The solar stand 53 includes a plurality of steel plates which are welded to form a hollowed-out cuboid. The top of the solar stand 53 is in bolted connection with the solar panel 51. The water storage tank 33 and the electrical box 52 are fixed in the middle of the solar stand 53. The pumping assembly 4 is fixed at the bottom of the solar stand 53. The signal antenna 522 is fixed on the electrical box. The signal antenna 522 is in signal connection with the remote signal end. The signal end of this embodiment directly selects signal devices in the conventional technology, such as municipal construction monitoring terminals, computers and mobile equipments. The electric box is internally provided with the storage battery 523 and the controller 521. The controller 521 is electrically connected with the solar panel 51, the signal antenna 522, the first motor 111, the second motor 41, the bathysonde 331 and the humidity sensitive element 115, respectively.

The storage battery 523 of this embodiment is fully charged before the experiment, so that insufficient power in continuous rainy days is avoided. If the field experiment lasts for a long time, an additional standby battery or a solar panel 51 can be arranged to prolong the field working time. The solar panel 51 is provided with an illumination intensity sensor. The solar panel 51 converts light energy into electrical energy and stores the electrical energy in the storage battery 523 through the controller 521. The storage battery 523 provides the electrical energy for the controller 521. The controller 521 receives signals from the bathysonde 331, the humidity sensitive element 115 and the illumination intensity sensor. The amount of water in the water storage tank 33, the rainfall signal and the local light intensity can be detected. The rain shielding function of the roller shutter can be enabled by controlling the first motor 111. The rainfall intensity of the rainfall assembly 2 can be controlled by controlling the rotational speed of the second motor 41, and at the same time, the controller 521 monitors the electric quantity of the storage battery 523.

The remote signal end detects the signal in the controller 521 in real time through the signal antenna 522 and transmits an instruction to the controller 521 to modify the rainfall simulation intensity, monitor the water quantity of the water storage tank, and collect the natural rainfall intensity and illumination intensity in the experimental area.

At the end of the experiment, the soil erosion amounts of the experimental ground 6 and the control ground are obtained through an existing soil erosion measuring device and a measuring method thereof. The soil erosion measuring device and the measuring method are the prior art and are not protected by the present disclosure, so the specific measuring process will not be described in detail. The obtained rainfall simulation intensity, the measured natural rainfall intensity and the local illumination intensity can be used for providing data support for the analysis of late soil erosion amount, but the present disclosure only provides data of rainfall intensity and illumination intensity related to the soil erosion amount, but does not protect the analysis process of the soil erosion amount.

The working principle of the embodiment is as follows.

In the aspect of automatic artificial rainfall simulation, the controller 521 controls the rotational speed of the second motor and controls the starting of the second motor 41 at regular intervals. The second motor 41 drives the water pump 43 to rotate. The water pump 43 converts mechanical energy into hydraulic energy, transports water from the water storage tank 33 into the copper pipe through the water pipe 23. The water from the copper pipe flows into the rainfall copper pipe, and then is ejected through the sprinkler heads 221 in the rainfall copper pipe to simulate artificial rainfall. The controller 521 can control the rainfall simulation intensity by controlling the rotational speed of the second motor 41.

In the aspects of automatic rain shielding and rain collection, when it rains, the humidity sensitive element 115 on the mounting seat 11 detects the signal and transmits the signal into the controller 521. The controller 521 controls the first motor 111 to rotate, and drives the drum 113 to rotate, so that the curtain plate 114 slides into the rain collector 31 in the sliding chute 121, so that rain shielding is realized. All the rainwater on the curtain plate 114 is guided into the rain collector 31 because the curtain plate 114 has an inclined angle, and the rain collector 31 guides the water into the water storage tank 33, so that automatic rain shielding and rain collecting functions are realized.

In the aspect of acquiring rainfall intensity of natural rainfall, the bathysonde 331 in the water storage tank 33 detects the water depth of the water storage tank 33 in real time and feeds back the water depth to the controller 521, and the controller 521 acquires the water output quantity through the water depth and the bottom area of the water storage tank 33. When it rains, the water storage tank 33 acquires the water in the rainwater collector 31, the bathysonde 31 detects the water level change, and the controller 521 acquires the rainfall intensity of natural rainfall through the water level change.

In the aspect of remote control, the remote signal end can receive the signal from the controller 521 through the signal antenna 522 connected with the controller 521 and can remotely transmit the instruction to the controller 521.

According to one embodiment of the present application, disclosed is an experimental method of the field integrated device for automatically shielding and collecting rainwater and simulating rainfall, including the following steps:

S1, setting adjacent experimental ground 6 and contrast ground with equal area, and placing the experimental ground 6 below the roller shutter assembly 1;

S2, setting the rotational speed and working time of the second motor 41, starting the second motor 41 to drive the water pump 43 to rotate, pumping the rainwater in the water storage tank 33 to the rainfall assembly 2, and spraying the rainwater to the experimental ground 6 below the roller shutter assembly 1 by the sprinkler heads 221 in the rainfall assembly 2 to simulate artificial rainfall;

S3, collecting a natural rainfall signal in real time by the humidity sensitive element 115, and if the humidity sensitive element 115 does not detect the natural rainfall signal, executing step S7, and if the humidity sensitive element 115 detects the natural rainfall signal, executing step S4;

S4, transmitting the detected natural rainfall signal to the controller 521 by the humidity sensitive element 115, starting the first motor 111 of the driving assembly 1 by the controller 521, driving the drum 113 to rotate by the first motor 11, and driving the curtain plate 114 to slide in the sliding chute 121 by the drum 113 until the free end of the curtain plate 114 extends into the rainwater collector 31 to shield natural rainwater;

S5, enabling the natural rainwater to enter the rainwater collector 31 along the curtain plate 114 and fall into the water storage tank 33 through the rainwater collecting pipe 32 to collect the rainwater;

S6, detecting the water level change of the water storage tank 33 by the bathysonde 331, and calculating to obtain the natural rainfall intensity according to the water level change; and S7, turning off the second motor to end the experiment.

Specific embodiments of the present disclosure are the conditions described in detail below in combination with the attached figures, but should not be understood that the scope of the present disclosure is not limit by the specific embodiments. Within the scope described in the claims, various modifications and variations that can be made by those skilled in the art without creative work are still within the scope of protection of this patent.

What is claimed is:

1. A field integrated device for automatically shielding and collecting rainwater and simulating rainfall, comprising a roller shutter assembly (1), wherein the roller shutter assembly (1) comprises a four-corner support (13) with height difference, the high side of the four-corner support (13) is connected with a mounting seat (11), and the low side of the four-corner support (13) is respectively connected with two baffles (12); the two baffles (12) are respectively oppositely fixed on the two ends of the mounting seat (11), the mounting seat (11) is provided with a humidity sensitive element (115), the mounting seat (11) is internally provided with a driving assembly and a roller shutter, the driving assembly is rotationally connected with the roller shutter, and the driving assembly drives a curtain plate (114) of the roller shutter to be unfolded and contracted between the two baffles (12); sliding chutes (121) are formed in the two baffles (12), the two sliding chutes (121) are arranged oppositely, and two sides of a free end of the curtain plate (114) are respectively embedded into the two sliding chutes (121), and the curtain plate (114) is unfolded and contracted in the sliding chutes (121); a rainfall assembly (2) is fixed between the two baffles (12), the rainfall assembly (2) is connected with a pumping assembly (4), the pumping assembly (4) is connected with the bottom of a water storage tank (33), the upper part of the water storage tank (33) is connected with a rainwater collector (31), the two sliding chutes (121) extend into the rainwater collector (31), the free end of the curtain plate (114) extends into the rainwater collector (31) through the sliding chutes (121), and the rainwater collector (31) is fixed at the lower parts of the two baffles (12) for collecting the rainwater on the roller shutter; the pumping assembly (4) and the water storage tank (33) are fixed on a solar stand (53) of a solar module (5); and the solar module (5) is respectively electrically connected with the humidity sensitive element (115), the driving assembly and the pumping assembly (4), and the solar module (5) is in signal connection with a remote signal end.

2. The field integrated device for automatically shielding and collecting rainwater and simulating rainfall according to claim 1, wherein the roller shutter comprises a drum (113), and the drum (14) is connected with the driving assembly; one side of the curtain plate (114) is fixedly connected with the drum (14), and the other side of the curtain plate (114) is wound on the drum (14).

3. The field integrated device for automatically shielding and collecting rainwater and simulating rainfall according to claim 2, wherein the driving assembly comprises a first motor (111), and the first motor (111) is fixed in the mounting seat (11); and the output shaft of the first motor (111) is rotationally connected with the drum (113) through a first coupling (112), and the first motor (111) is electrically connected with the solar module (5).

4. The field integrated device for automatically shielding and collecting rainwater and simulating rainfall according to claim 3, wherein the rainwater collector (31) is a hollow cylinder, both ends of the cylinder are respectively welded on the two baffles (12), a rainwater collecting port (311) is formed in the middle of the cylinder, the two sliding chutes (121) extend into the rainwater collecting port (311), a water outlet hole (312) is formed in one end of the cylinder, and the water outlet hole (312) is connected with the water storage tank (33) through a rainwater collecting pipe (31); a free end of the curtain plate (114) extends into the rainwater collecting port (311) through the sliding chutes (121), and the rainwater in the cylinder flows into the water storage tank (33) through the water outlet hole (312).

5. The field integrated device for automatically shielding and collecting rainwater and simulating rainfall according to claim 4, wherein the rainfall assembly (2) comprises a steel pipe (21), a water inlet of the steel pipe is connected with the pumping assembly (4) through a water pipe (23), and the steel pipe (21) is connected with a plurality of rainfall steel pipes (22); the rainfall steel pipes (22) are uniformly and vertically distributed on the steel pipe (21), one end is welded and connected with the steel pipe (21), the other end is welded and connected with the baffle (12), and the welding position is located under the sliding chute (121); and a plurality of sprinkler heads (221) are arranged on the rainfall steel pipe (22).

6. The field integrated device for automatically shielding and collecting rainwater and simulating rainfall according to claim 5, wherein the pumping assembly (4) comprises a base (46), the base (46) is fixed on the solar stand (53), a second motor (41) is fixed on the base (46), the output shaft of the second motor (41) is rotationally connected with a water pump (42) through a second coupling (42), water inlet of the water pump (42) is connected with the water storage tank (33), and the water outlet of the water pump (42) is connected with the water pipe (23).

7. The field integrated device for automatically shielding and collecting rainwater and simulating rainfall according to claim 6, wherein a bathysonde (331) is fixed on the top of the water storage tank (33), and the bathysonde (331) is electrically connected with the solar module (5).

8. The field integrated device for automatically shielding and collecting rainwater and simulating rainfall according to claim 7, wherein the solar module (5) comprises a solar panel (51), the solar panel (51) is fixed on the top of the solar stand (53), an electrical box (52) is fixed in the middle of the solar stand (53), a signal antenna (522) is fixed on the electrical box (52), the signal antenna (522) is in signal connection with the remote signal end, a storage battery (523) and a controller (521) are arranged in the electrical box (52), and the controller (521) is electrically connected with the solar panel (51), the signal antenna (522), the first motor (111), the second motor (41), the bathysonde (311) and the humidity sensitive element (115), respectively.

9. An experimental method of the field integrated device for automatically shielding and collecting rainwater and simulating rainfall according to claim 1, comprising the following steps:
  S1, setting adjacent experimental ground and contrast ground with equal area, and placing the experimental ground below the roller shutter assembly;
  S2, setting a rotational speed and working time of a second motor, starting the second motor to drive the water pump to rotate, pumping the rainwater in the water storage tank to the rainfall assembly, and spraying the rainwater to the experimental ground below the roller shutter assembly by a sprinkler heads in the rainfall assembly to simulate artificial rainfall;
  S3, collecting a natural rainfall signal in real time by the humidity sensitive element, and if the humidity sensitive element does not detect the natural rainfall signal, executing step S7, and if the humidity sensitive element detects the natural rainfall signal, executing step S4;
  S4, transmitting the detected natural rainfall signal to the controller by the humidity sensitive element, starting a first motor of the driving assembly by the controller, driving a drum to rotate by the first motor, and driving the curtain plate to slide in the sliding chute by the drum until a free end of the curtain plate extends into the rainwater collector to shield natural rainwater;
  S5, enabling the natural rainwater to enter the rainwater collector along the curtain plate and fall into the water storage tank through a rainwater collecting pipe to collect the rainwater;
  S6, detecting a water level change of the water storage tank by a bathysonde, and calculating to obtain a natural rainfall intensity according to the water level change; and
  S7, turning off the second motor to end the experiment.

10. The experimental method according to claim 9, wherein the roller shutter comprises the drum (113), and the drum (14) is connected with the driving assembly; one side of the curtain plate (114) is fixedly connected with the drum (14), and the other side of the curtain plate (114) is wound on the drum (14).

11. The experimental method according to claim 10, wherein the driving assembly comprises a first motor (111), and the first motor (111) is fixed in the mounting seat (11); and the output shaft of the first motor (111) is rotationally connected with the drum (113) through a first coupling (112), and the first motor (111) is electrically connected with the solar module (5).

12. The experimental method according to claim 11, wherein the rainwater collector (31) is a hollow cylinder, both ends of the cylinder are respectively welded on the two baffles (12), a rainwater collecting port (311) is formed in the middle of the cylinder, the two sliding chutes (121) extend into the rainwater collecting port (311), a water outlet hole (312) is formed in one end of the cylinder, and the water outlet hole (312) is connected with the water storage tank (33) through the rainwater collecting pipe (31); the free end of the curtain plate (114) extends into the rainwater collecting port (311) through the sliding chutes (121), and the rainwater in the cylinder flows into the water storage tank (33) through the water outlet hole (312).

13. The experimental method according to claim 12, wherein the rainfall assembly (2) comprises a steel pipe (21), a water inlet of the steel pipe is connected with the pumping assembly (4) through a water pipe (23), and the steel pipe (21) is connected with a plurality of rainfall steel pipes (22); the rainfall steel pipes (22) are uniformly and vertically distributed on the steel pipe (21), one end is welded and connected with the steel pipe (21), the other end is welded and connected with the baffle (12), and the welding position is located under the sliding chute (121); and a plurality of sprinkler heads (221) are arranged on the rainfall steel pipe (22).

14. The experimental method according to claim 13, wherein the pumping assembly (4) comprises a base (46), the base (46) is fixed on the solar stand (53), the second motor (41) is fixed on the base (46), the output shaft of the second motor (41) is rotationally connected with a water pump (42) through a second coupling (42), the water inlet of the water pump (42) is connected with the water storage tank (33), and the water outlet of the water pump (42) is connected with the water pipe (23).

15. The experimental method according to claim 14, wherein the bathysonde (331) is fixed on the top of the water storage tank (33), and the bathysonde (331) is electrically connected with the solar module (5).

16. The experimental method according to claim 15, wherein the solar module (5) comprises a solar panel (51), the solar panel (51) is fixed on the top of the solar stand (53), an electrical box (52) is fixed in the middle of the solar stand (53), a signal antenna (522) is fixed on the electrical box (52), the signal antenna (522) is in signal connection with the remote signal end, a storage battery (523) and a controller (521) are arranged in the electrical box (52), and the controller (521) is electrically connected with the solar panel (51), the signal antenna (522), the first motor (111), the second motor (41), the bathysonde (311) and the humidity sensitive element (115), respectively.

* * * * *